United States Patent [19]

Greig et al.

[11] 3,850,788

[45] Nov. 26, 1974

[54] GLASS-REINFORCED COMPOSITE MATERIALS

[75] Inventors: Ian Robert Kennedy Greig, Warrington; John Mackenzie Jackson, Newburgh, near Wigan, both of England

[73] Assignee: Dilkington Brothers Limited, St. Helens, Lancashire, England

[22] Filed: Nov. 21, 1973

[21] Appl. No.: 417,834

[30] Foreign Application Priority Data
Nov. 21, 1972 Great Britain................ 53764/72

[52] U.S. Cl............................ 161/168, 65/18, 65/21, 65/60, 117/124 E, 161/185
[51] Int. Cl............................................. C03c 17/32
[58] Field of Search................... 65/18, 21, 144, 60; 117/124 D, 124 E; 161/168, 185

[56] References Cited
UNITED STATES PATENTS
2,908,591  10/1959  Sack ................................ 65/60 X
2,970,127  1/1961  Slayter et al. ..................... 161/168
3,047,409  7/1962  Slayter et al. ..................... 65/60 X
3,437,517  4/1969  Eilerman et al. .................. 65/60 X FOREIGN PATENTS OR APPLICATIONS
1,177,964  12/1958  France................................ 65/21

*Primary Examiner*—Arthur D. Kellogg
*Attorney, Agent, or Firm*—Sughrue, Rothwell, Mion, Zinn & Macpeak

[57] ABSTRACT

Composite materials reinforced by flakes of glass are made by applying a powdered, partially polymerised epoxy resin to fresh surfaces of a ribbon of film glass, e.g. by electrostatically spraying the powdered resin on to both surfaces of the glass ribbon as it is taken from a float bath, subsequently cutting or breaking the glass ribbon to form glass flakes most of which have an aspect ratio of between 100 and 200, assembling the flakes together, possibly with a further addition of resin, to form an assemblage with a glass content of between 20% and 70% by weight, and completing the polymerisation of the resin, e.g., under heat and pressure, to bond the assemblage together.

12 Claims, No Drawings

GLASS-REINFORCED COMPOSITE MATERIALS

BACKGROUND OF THE INVENTION

1. Field of the Invention

This invention relates to glass reinforced composite materials and specifically to methods of making composite materials reinforced with flakes of glass.

2. Description of the Prior Art

Such composite materials, comprising glass flakes in a matrix of polymeric material, have been previously made and tested. Although they should theoretically have physical properties approaching those of composite materials reinforced with glass fibres, in practice this has proved difficult to realise.

The difficulty has been partly due to the fact that, unless the glass has a fresh surface, it is liable to have absorbed small quantities of gases or vapours (such as water vapour) which render it difficult to ensure adequate adhesion of the polymeric matrix material to the glass flakes. Another cause of the reduced physical strength has been found to be damage to the surfaces and edges of the flakes, occasioned during the cutting or breaking of a glass ribbon to form the flakes.

SUMMARY OF THE INVENTION

According to the present invention, a method of making a glass-reinforced composite material comprises applying a powdered, partially polymerised epoxy resin material to fresh surfaces of a ribbon of film glass so as to form a continuous flexible surface coating on both sides of the ribbon, cutting or breaking the ribbon to form coated flakes of glass most of which have an aspect ratio of between 100 and 200, forming the flakes into an assemblage of a desired shape with a glass content of between 20% and 70% by weight, and completing the polymerisation of the epoxy resin material to bond the assemblage together and thereby form the composite material.

Preferably the glass ribbon is formed continuously on a flat bath and the powdered, partially polymerised epoxy resin material is applied to both surfaces after removing the ribbon from the float bath.

In this way it can be ensured that the flakes are truly flat and entrapment of air is consequently reduced.

The powdered epoxy resin material may be sprayed on to the glass ribbon while the ribbon is at a temperature high enough to melt the powdered resin. The spraying is preferably effected electrostatically.

The coated glass flakes may be pressed together and heated to fuse the epxoy resin coatings together and to complete the polymerisation. A further amount of the epoxy resin, or of another compatible resin, may be added in powdered or liquid form before the pressing and heating.

We have found that composite materials made in this way have considerably improved physical properties as compared with the known materials. It appears that adhesion is much improved by use of the epoxy resin coating and damage to the flakes is substantially reduced by applying the coating before cutting or breaking the ribbon. The specified aspect ratio of the flakes, i.e., the ratio of their length or width to their thickness, and the specified glass content of the composite material have also been found to be important for the strength of the material.

The preferred resin used with electrostatic spraying is a partially polymerised powdered epoxide resin sold under the Trade Mark DURAPLAST by Arthur Holder and Sons of Birmingham, which can be cured by heat to a thermoplastic state, but it is also possible to use other epoxy resin materials which can be cured to a hardened though still flexible condition.

As stated above, it is preferred to spray the powdered resin electrostatically on to the glass ribbon when the latter is hot enough to melt the powdered resin. In this way, the continuous coating can be formed without further heating. The glass, being hot, is sufficiently conductive to act as an earth in the electrostatic spraying process. It is, however, also possible to coat the glass ribbon with the powdered resin at room temperature and subsequently flash heat it to convert the powdered resin into the continuous coating.

The glass flakes should preferably have a thickness of between 10 and 100 microns. As indicated above, the aspect ratio, i.e., the ratio of width or length to thickness, of the majority of the flakes must be between 100 and 200. In practice, the flakes may be cut or broken from a glass ribbon by the known techniques of diamond scoring and crack running, with the aim of producing as high a proportion as possible with an aspect ratio of around 200, and the flakes may then be sieved to remove as many as possible of any broken flakes which have an aspect ratio below 100. The glass flakes may be strips of about 2 inches by ¼ inch in size.

The final composite material may be formed by hot pressing the coated flakes together, as indicated above, with or without further addition of the epoxy resin, or the flakes could be immersed in a liquid epoxy resin which is subsequently hardened by cooling or a curing reaction. The composite material must have a glass content between 20% and 70% by weight, preferably between 50% and 60%.

DETAILED DESCRIPTION OF THE INVENTION

EXAMPLE I

A glass ribbon 500 mm wide and 20 $\mu$m thick was produced at the rate of 1,000 metres per hour, on a float bath. After removing the ribbon from the bath, both faces were continuously coated, using an electrostatic powder spraying technique and a $\beta$-stage, i.e., partially polymerised, powdered epoxide resin ("Duraplast" manufactured by A. Holder and Sons), at a point where the ribbon had cooled to 200°C. The glass at this temperature provided enough conduction to "earth" the charged powder particles and enough heat to fuse these particles into a thermoplastic film, without effecting cure. Using 30 Kg of powder per hour a 12 $\mu$m film was obtained on each face. The coated glass ribbon was then broken into flakes of aspect ratio approximately 200:1 by "diamond scoring" and "crack running." These flakes were formed into strip composites 100 mm long and 20 mm wide by pressing for 30 minutes at 150°C and 0.075 MN/m$^2$ in a metal mould. A small amount of the epoxide powder, which was used in the earlier coating process, was added to aid flow during pressing and so minimise damage to the flakes. The glass content of the finished strip composites was 67% by weight.

The strips were then tested for flexural strength, elastic modulus and tensile strength by the methods laid down in British Standard BS 2782. Briefly, the flexural strength was tested by supporting a specimen on parallel inverted V-section bars and applying an increasing load to the other side of the specimen by means of a third V-section bar parallel to, and midway between, the supports until the specimen fractured. The elastic modulus (ratio of stress to strain) was tested by gripping the ends of a specimen, applying tensile stress to the specimen and noting the press required to produce an elongation (strain) of 0.2%. The tensile strength was tested by applying increasing tensile stress to a specimen until it fractured.

Typical results obtained were:

| | | |
|---|---|---|
| Flexural Strength | (BS 2782, Method 304 B) | 350 MN/m$^2$ |
| Elastic Modulus | (BS 2782, Method 302 B) | 12 GN/m$^2$ |
| Tensile Strength | (BS 2782, Method 201 L) | 135 MN/m$^2$ |

EXAMPLE II

Coated flakes, produced as in Example I, were formed into 100 mm × 100 mm composites by pressing for 30 minutes at 150°C and .30 MN/m$^2$ in a metal mould. A small amount of the epoxide powder, which was used in the earlier coating process, was added to aid flow during pressing. The glass content of the square composites was 62.5% by weight. These squares were then cut into strips 20 mm wide and tested as above. The strengths obtained for these mechanically cut strips were some 30% lower than those of the moulded strips of Example I, typical flexural strengths being around 250 MN/m$^2$.

EXAMPLE III

Coated flakes, produced as in Example I, were formed into 100 mm × 20 mm strip composites by pressing in a metal mould with sufficient liquid epoxide resin to completely wet the flakes, giving a glass content of 56% by weight. The resin consisted of a mixture of 100 parts Epikote 815, 90 parts nadic methyl anhydride (i.e., endo-methylene methyl anhydride) and 2.5 parts benzyl dimethylamine (standard formulation recommended by Shell). The moulding conditions were 16 hours at 150°C and .075 MN/m$^2$. This system gave typical strengths as below:

| | |
|---|---|
| Flexural Strength | 1175 MN/m$^2$ |
| Elastic Modulus | 1.5 GN/m$^2$ |

EXAMPLE IV

Pieces of glass approximately 500 mm × 100 mm were taken from the ribbon, produced as described previously. These were coated on both sides using "Duraplast" powdered epoxide resin and an electrostatic hand gun. The powder was fused into a continuous film by passing through an oven at 200°C. the residence time being sufficient to fuse the powder but insufficient to effect cure. Flakes produced from this glass were made into composites as in Examples I, II and III, with similar glass contents; these composites gave similar strength and moduli when tested.

It was noted that when pieces of glass taken from the ribbon as in Example IV were stored in the laboratory separated by pieces of tissue paper, and subsequently etched in 2% hydrofluoric acid to remove surface scratches resulting from storage before being coated as in Example IV, the strength results of composites made from this glass were in the same range as those made from pristine glass.

EXAMPLE V

Coated flakes produced as in Example I were formed into a 100 mm × 100 mm composite by pressing for 30 minutes at 150°C and 0.20 MN/m$^2$ in a metal mould. A small amount of the epoxide powder which was used in the earlier coating process was added to aid flow and perhaps prevent damage during the pressing. These squares were then cut into strips 20 mm wide and tested as above. The glass contents of the broken pieces were measured after testing. Typical flexural strengths were 220 MN/m$^2$ for a composite having a glass content of 45%.

EXAMPLE VI

Coated flakes produced as in Example I were formed into a 100 mm × 100 mm composite by pressing for 16 hours at 150°C and 0.075 MN/m$^2$ in a liquid resin system as described in Example III. The mould was fitted with stops to give a 3 mm thick composite sheet which was cut into 100 mm × 20 mm strips for testing. Typical flexural strengths were 250 MN/m$^2$ for a composite having a glass content of 40%, and 145 MN/m$^2$ for one with a glass content of 20%.

We claim:

1. A method for making a glass-reinforced composite material, comprising applying a powdered, partially polymerised epoxy resin material to fresh surfaces of a ribbon of film glass so as to form a continuous flexible surface coating on both sides of the ribbon, cutting or breaking the ribbon to form coated flakes of glass most of which have an aspect ratio of between 100 and 200, forming the flakes into an assemblage of a desired shape with a glass content of between 20% and 70% by weight, and completing the polymerisation of the epoxy resin material to bond the assemblage together and thereby form the composite material.

2. A method according to claim 1, wherein the glass ribbon is formed continuously on a float bath and the powdered, partially polymerised epoxy resin material is applied to both surfaces after removing the ribbon from the float bath.

3. A method according to claim 2, wherein the powdered epoxy resin material is sprayed on to the glass ribbon while the ribbon is at a temperature high enough to melt the powdered resin.

4. A method according to claim 3, wherein the spraying is effected electrostatically.

5. A method according to claim 1, wherein the glass ribbon is coated with the powdered resin at room temperature and subsequently flash heated to convert the powdered resin into the continuous coating.

6. A method according to claim 1, wherein the coated glass flakes are pressed together and heated to fuse the epoxy resin coatings together and to complete the polymerisation.

7. A method according to claim 6, wherein a further quantity of the epoxy resin is added before the pressing and heating.

8. A method according to claim 1, wherein the flakes are immersed in a liquid epoxy resin to form the assemblage of desired shape, and the resin is subsequently hardened by cooling or a curing reaction.

9. A method according to claim 1, wherein the glass content of said assemblage is between 50% and 60% by weight.

10. A method according to claim 1, wherein the glass flakes have a thickness of between 10 and 100 microns.

11. A method according to claim 1, wherein the glass ribbon is cut or broken to form the glass flakes by diamond scoring and crack running, and the flakes are then sieved to remove broken flakes having an aspect ratio below 100.

12. Glass-reinforced composite material produced by the method of claim 1.

* * * * *

UNITED STATES PATENT OFFICE
CERTIFICATE OF CORRECTION

Patent No. 3,850,788          Dated November 26, 1974

Inventor(s) Ian Robert Kennedy GREIG et al

It is certified that error appears in the above-identified patent and that said Letters Patent are hereby corrected as shown below:

Under Assignee: delete "Dilkington Brothers Limited" and substitute therefor -- Pilkington Brothers Limited --

Signed and sealed this 8th day of April 1975.

(SEAL)
Attest:

RUTH C. MASON
Attesting Officer

C. MARSHALL DANN
Commissioner of Patents
and Trademarks